(12) United States Patent
Lin

(10) Patent No.: US 7,043,416 B1
(45) Date of Patent: May 9, 2006

(54) SYSTEM AND METHOD FOR STATE RESTORATION IN A DIAGNOSTIC MODULE FOR A HIGH-SPEED MICROPROCESSOR

(75) Inventor: Shuaibin Lin, Broomfield, CO (US)

(73) Assignee: LSI Logic Corporation, Milpitas, CA (US)

( * ) Notice: Subject to any disclaimer, the term of this patent is extended or adjusted under 35 U.S.C. 154(b) by 867 days.

(21) Appl. No.: 09/916,924

(22) Filed: Jul. 27, 2001

(51) Int. Cl.
*G06F 17/50* (2006.01)
*G06F 9/00* (2006.01)

(52) U.S. Cl. .................. 703/17; 712/220; 702/183; 707/206

(58) Field of Classification Search .............. 703/17; 712/220; 707/206; 702/183
See application file for complete search history.

(56) References Cited

U.S. PATENT DOCUMENTS

| | | | | |
|---|---|---|---|---|
| 5,291,586 A | * | 3/1994 | Jen et al. ..................... | 712/220 |
| 5,657,330 A | * | 8/1997 | Matsumoto .................. | 714/733 |
| 5,983,017 A | * | 11/1999 | Kemp et al. ................. | 717/129 |
| 6,107,852 A | * | 8/2000 | Durham et al. .............. | 327/203 |

OTHER PUBLICATIONS

Engineering Approach to Digital Design by William I. Fletcher, Prentice-Hall, Inc., 1980, pp. 276-279.*
Advanced Microprocessors by Danial Tabak, McGraw-Hill, Second Edition, 1995, ISBN 0-07-062843-2, pp. 28, 67, 139, 145, 363, 364, and 466.*

* cited by examiner

*Primary Examiner*—Paul L. Rodriguez
*Assistant Examiner*—Dwin M. Craig
(74) *Attorney, Agent, or Firm*—Daffer McDaniel LLP

(57) ABSTRACT

A system and method are presented for saving and restoring the state of a diagnostic module in a microprocessor. The diagnostic module contains a complex break state machine, capable of halting the microprocessor at specified breakpoints. These breakpoints are based on combinations of instruction locations and/or data values, along with previous machine states. A problem occurs with prior art diagnostic modules when the processor returns from an exception occurring during a fix-up cycle inserted to handle a data load miss associated with an instruction located in a branch delay slot (the location immediately following a conditional branch instruction). Under these circumstances, the exception handler restores the program counter to the location of the branch instruction, causing the branch to be re-executed. The prior art state machine erroneously updates its internal state a second time when the branch is re-executed. According to the system and method disclosed herein, at each state change the previous machine state saved. Thus, when a branch instruction is re-executed, the complex break state machine of the present invention is restored to its previous state, thereby correcting the error.

18 Claims, 5 Drawing Sheets

|  | T1 | T2 | T3 | T4 | T5 | T6 | T7 | T8 | T9 | T10 |
|---|---|---|---|---|---|---|---|---|---|---|
| INSTR. 1 | IF | RD | EXE | MEM | WB | | | | | |
| INSTR. 2 | | IF | RD | EXE | MEM | WB | | | | |
| INSTR. 3 | | | IF | RD | EXE | MEM | WB | | | |
| INSTR. 4 | | | | IF | RD | EXE | MEM | WB | | |
| INSTR. 5 | | | | | IF | RD | EXE | MEM | WB | |
| INSTR. 6 | | | | | | IF | RD | EXE | MEM | WB |

Fig. 1

SYSTEM AND METHOD FOR STATE RESTORATION IN A DIAGNOSTIC MODULE FOR A HIGH-SPEED MICROPROCESSOR

BACKGROUND OF THE INVENTION

1. Field of Invention

This invention relates to microprocessor design, and more particularly, to the implementation of on-chip debug capability in a microprocessor.

2. Description of Related Art

Modern microprocessors offer unprecedented performance. For a variety of digital integrated circuits (IC's), speed, level of integration (i.e. transistors per square centimeter) and capabilities have improved. Moreover, in many cases, these performance improvements have been accompanied by reductions in size, power consumption and cost of the devices. However, these benefits require greater complexity in digital logic design. Because of this complexity, the investment of time and resources by the manufacturer to design and fabricate a digital logic device has increased. For this same reason, the possibility of a mistake or oversight on the part of the designer has become more likely.

An architectural feature common to most high performance microprocessors is the instruction pipeline. A microprocessor typically processes each instruction in a sequence of operations. For example, fetching the instruction from memory is often followed by a decoding operation, to determine what operands are needed and where they are located. Once the operands are available, the instruction may be executed, following which results are saved back to memory. Rather than performing the entire sequence of operations on one instruction prior to fetching the next, an improvement in throughput can be obtained by performing the operations concurrently on consecutive instructions. The pipeline can be likened to an assembly line, where a series of operations is performed on a product in stages, as it moves down the line. Ideally, if each pipeline stage performs its associated operation in a single clock cycle, the average processor execution rate can be as high as one instruction every clock cycle.

In practice, however, since the performance benefits of an instruction pipeline depend on keeping the pipeline full, maximum throughput is generally not possible on a consistent basis. A complication arises when a data transfer cannot be performed quickly enough to sustain pipeline throughput. For example, if the instruction currently making its way through the pipeline requires data to be fetched from memory and, for whatever reason, the memory cannot be accessed in the allotted time, the pipeline must be halted for at least one clock cycle while the correct data can be fetched. This failure to access the data needed by the instruction propagating through the pipeline is often called a data "load miss" (or "read miss"), and the extra clock cycle is referred to as a "fix-up cycle."

The use of fix-up cycles to handle load misses can lead to a problem for the diagnostic circuitry in a pipeline-equipped microprocessor. The problem occurs when an exception occurs (i.e., an interrupt resulting from some condition internal to the microprocessor) during the fix-up cycle inserted to handle a load miss associated with an instruction in a "branch delay slot." A branch delay slot is the instruction position immediately following a branch instruction. A complex break state machine associated with the diagnostic circuitry monitors addresses and data values present on the microprocessor buses. The state machine updates its internal state in response to trigger events, which correspond to specified addresses and data values. If a prescribed combination of trigger events and previous internal states occurs (i.e., a complex breakpoint), the state machine halts the microprocessor, permitting its internal status to be examined.

When an exception occurs, the microprocessor temporarily suspends the current program sequence to enter a special program segment, known as an exception handler, designed to deal with the exception. Following execution of the exception handler, the normal program sequence is resumed. When the exception occurs during execution of an instruction in a branch delay slot, normal program execution typically resumes by re-executing the branch instruction. This can result in the complex break state machine being erroneously updated twice for the same branch instruction. One answer to this problem would seem to be lengthening (i.e., adding more stages to) the pipeline. It would then be possible to compensate for a data load miss without inserting a fix-up cycle. However, considerable additional circuitry would be required to extend the pipeline, making this an expensive and impractical solution.

In view of this problem, it would be desirable to have a means of avoiding spurious updates of the complex break state machine associated with the diagnostic circuitry of a high-performance microprocessor. Ideally, the solution should be inexpensive and should not compromise the performance of the microprocessor or the rest of the diagnostic circuitry.

SUMMARY OF THE INVENTION

The problems outlined above are addressed by an improved diagnostic system for a microprocessor. This system is based on a state machine that changes its internal state in response to trigger events generated by the microprocessor. The state machine is capable of halting the microprocessor in response to combinations of trigger events and its own previous machine states. Once halted or "stalled," the internal state of the microprocessor can be determined by the diagnostic system. Trigger events correspond to specified memory locations or data values.

A novel feature of the diagnostic system is that, each time the state machine changes states, the previous state is saved in a backup register. If a state change occurs as a result of an invalid trigger event, the backup register is used to restore the state machine to its previous state. In the embodiments discussed herein, the microprocessor includes an exception handler, which returns execution to a branch instruction upon returning from an exception associated with the instruction in the memory location immediately following that of the branch. This results in the branch instruction being re-executed, creating a spurious trigger event, which causes the state machine to be updated twice for the same instruction. However, this error is corrected in the diagnostic system of the present invention, by using the backup register to restore the previous machine state.

Also disclosed herein, is a method for saving and restoring states of a diagnostic module associated with a microprocessor. The diagnostic module changes its internal state in response to trigger events created by the microprocessor, and is capable of halting the microprocessor in response to combinations of these trigger events and its own previous internal states. Trigger events are associated with the microprocessor issuing a specified memory address or data value. An invalid trigger event may result when the microprocessor's exception handler causes the re-execution of a branch instruction, upon returning from an exception occurring within the fix-up cycle inserted to handle a data load miss associated with the instruction immediately following the branch (i.e., in the branch delay slot). Normally under these circumstances, the diagnostic module would erroneously update its state twice for the same instruction. This is avoided according to the method, wherein each time the diagnostic module changes its internal state, the previous state is saved to a backup register. If the internal state changes in response to an invalid trigger event, the previous state is restored from the backup register.

A microprocessor with an associated diagnostic module is also disclosed herein. The diagnostic module changes its internal state in response to trigger events created by the microprocessor, and is capable of halting the microprocessor in response to combinations of these trigger events and its own previous internal states. Trigger events occur when the microprocessor accesses specified memory locations or specified data values. Invalid trigger events may result when the microprocessor's exception handler causes the re-execution of a branch instruction, following the return from an exception occurring during the fix-up cycle inserted to handle a data load miss associated with an instruction in the branch delay slot (i.e. the location immediately following the branch instruction). Advantageously, the diagnostic module disclosed herein avoids erroneously updating its internal state twice for the same branch instruction. A backup register saves the internal state of the diagnostic module prior to each state change, and restores the previous state when a state change is induced by an invalid trigger event.

BRIEF DESCRIPTION OF THE DRAWINGS

Other objects and advantages of the invention will become apparent upon reading the following detailed description and upon reference to the accompanying drawings in which:

FIG. 1 illustrates the operation of an instruction pipeline;

Figure 2:
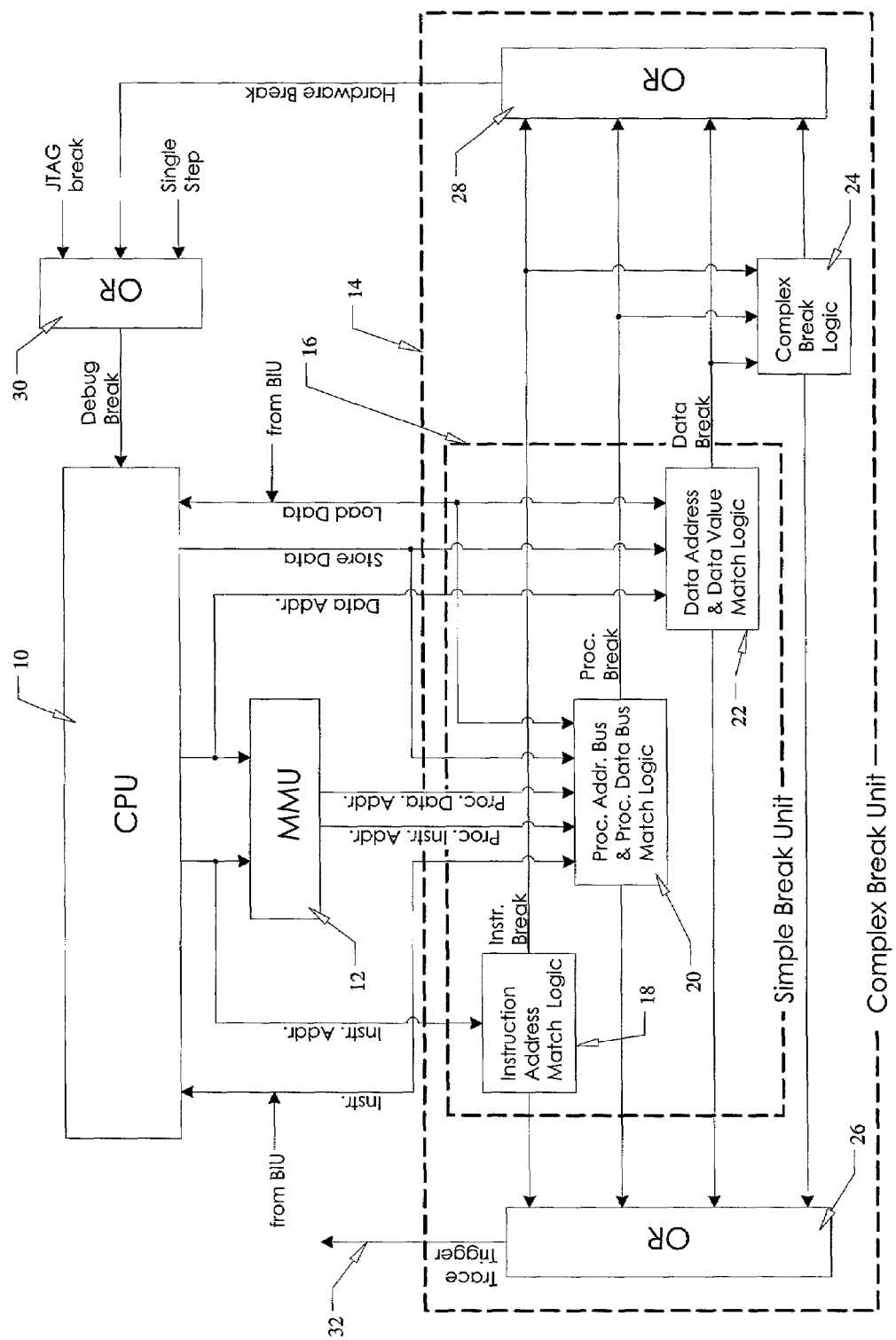
FIG. 2 is a block diagram of a microprocessor with a hardware break module.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Modern high-performance microprocessors are sophisticated, highly-integrated devices, employing numerous internal and external signals, and operating at very high clock rates. A number of performance-enhancing architectural features are present in these microprocessors. Unfortunately, some of these features also complicate testing of the processor.

In a standard microprocessor, memory latency limits the speed at which instructions may be completed, since memory instructions cannot complete until data is back from memory, enabling the processing of the next instruction in the sequence. No matter how fast the processor, overall throughput cannot exceed the speed with which the memory can be accessed. If necessary, a fast processor may insert "wait states" into its memory accesses to compensate for slower memory devices. Since no useful work is done by the processor during these wait states, they represent wasted processor cycles.

The microprocessor may interface to various types of memory. The majority of the processor's memory (often referred to as main memory) usually consists of Static Random Access Memory (SRAM) or Dynamic Random Access Memory (DRAM), and contains all the program instructions and data. If the processor had no other memory resources, its operating speed would be determined by the minimum access time of the main memory. In this case, upgrading the main memory with faster SRAM or DRAM could improve processor performance, but would probably be prohibitively expensive.

A data cache is a small (compared to the main memory) region of very high-speed memory into which data are copied in a single block transfer from the main memory. The processor then goes to the cache instead of the main memory to access the data, with no need for wait states. As long as read/write accesses are directed to the cache (i.e., there are no "cache misses"), the processor is able to operate at full speed. Not surprisingly, cache is costlier than conventional memory. However, since the amount of cache is much smaller than the main memory, this is not a significant penalty.

Note that cache is effective only when the majority of read/write activity is concentrated in a particular region of memory. The assumption underlying the use of cache is that consecutive memory accesses are confined to a single region of memory. If this assumption is not true (i.e., if read/write accesses are widely distributed throughout the memory space), a cache will do little to improve performance.

Another form of memory resource is a register file. Registers are built from fast multi-ported memory cells, and are integrated into the architecture of the processor itself—so they may typically be accessed in a single processor clock cycle. In a very simple processor, the register file may consist of a single register—known as the "accumulator." Modern high-speed processors typically incorporate at least 32 registers, collectively designated the "register file." Because register file accesses always occur at the full operating speed of the processor, they can be utilized to accelerate processor throughput. For example, a program may be deliberately written to preferentially use register file accesses rather than main memory accesses, with the expectation that it will run faster.

Yet another speed-enhancing architectural feature commonly employed in modern high-speed microprocessors is the instruction pipeline. Typically, execution of an instruction requires a sequence of operations to be performed on the instruction and its operands. For an exemplary processor, the operations performed on each instruction are:

| | |
|---|---|
| IF = | Instruction Fetch. |
| RD = | Instruction Decode and Read Operands From Register File. |
| EXE = | Instruction Execute - computational and logical instructions execute, conditional instructions are evaluated, and load/store address calculations are performed. |
| MEM = | Memory Access - CPU accesses cache for load/store instructions. |
| WB = | Write Back - CPU writes results back to register file. |

FIG. 1 illustrates the operation of a pipelined processor, which performs all five operations concurrently on five different instructions. Each of the five operations is completed in one clock cycle, as indicated by the T1 ... T10 axis along the top of the diagram. Note that INSTR. 2 is fetched into the pipeline at time T2, while INSTR. 1 is being decoded. Similarly, processing of INSTR. 2 is completed at time T6—just one clock cycle after the completion of INSTR. 1. The operation of pipeline is analogous to an automobile assembly line, where each worker on the line performs a single assembly operation on a car as it moves down the line—as opposed to completely assembling each car before beginning the next. The benefit of the pipeline is apparent in FIG. 1, where six instructions are processed in the same amount of time (from T1 to T10) taken to process two instructions, if each instruction were processed separately.

Optimally, each of the pipeline operations is accomplished in one processor clock cycle (as in FIG. 1). However, if any stage of the pipeline is unable to complete its operation in a single clock cycle, all the preceding stages must be made to wait. This is known as "stalling" the pipeline. This situation often arises in connection with conditional branch instructions. Normally, the processor executes instructions consecutively, in the same order in which they are fetched from memory. A conditional branch is an instruction that tests for a particular condition, and depending on the outcome, redirects the processor to an instruction at a different location (i.e., the "branch target"), rather than the next consecutive instruction.

As an example, consider the following sequence of instructions:

| | | | |
|---|---|---|---|
| (1) | | SUB | r3, r2, r1 |
| (2) | | BLTZ | r3, underflo |
| (3) | | LW | r2, load_it(r5) |
| (4) | | ADDI | r3, r3, 1 |
| (5) | underflo: | SW | r3, store_it(r5) |
| (6) | | J | loop |

The second instruction in this sequence is a conditional branch to the location labeled "underflo." The BLTZ instruction tests the contents of register r3—if r3 contains a value greater than or equal to zero, the next instruction in the sequence (i.e., LW) is executed. However, if r3 contains a negative value, the processor goes to the branch target location ("underflo") and continues execution from there.

Conditional branch instructions are part of the instruction set of virtually every microprocessor. However, they pose a problem for the instruction pipeline. To maintain maximum throughput, it is necessary to keep the pipeline full. This requires that as a given instruction enters the execution stage of the pipeline, the next instructions to be executed must be fetched. In FIG. 1, for example, it can be seen that the pipeline fetches the third instruction in the sequence (INSTR. 3) and decodes the second (INSTR. 2) while it executes the first (INSTR. 1). However, in the case of a conditional branch instruction, the next instruction to be executed could (depending on the result of the test) be either the instruction following the branch, or the branch target; prior to executing the branch instruction, it is not known which it will be. To deal with this situation, many modern pipeline-equipped microprocessors employ special classes of branch instructions that allow the programmer to optimize pipeline usage, based on the most likely path taken by a branch. Normally, the instruction immediately following a jump or branch is always executed while the target instruction is being fetched from storage.

The "branch likely" class of instructions operate exactly like their non-likely counterparts, except that when the branch is not taken, the instruction following the branch is cancelled. In many cases, the programmer can make a reasonable assumption about the direction most likely to be taken by a branch instruction. By making an appropriate choice of either a normal branch instruction or a branch likely instruction, the pipeline can remain filled in the majority of cases. If it is assumed the branch will not be taken, a normal branch instruction is used; the pipeline then fetches instructions immediately following the branch. On the other hand, if it is assumed the branch will be taken, a branch likely instruction is used; the pipeline then fetches instructions from the branch target, and ignores the instructions directly after the branch. For example, in the above instruction sequence, if it is assumed that the branch will not be taken, the third and fourth instructions will appear in the pipeline immediately following the branch instruction. On the other hand, if it is assumed that the branch will be taken, the fifth and sixth instructions will appear in the pipeline immediately following the branch instruction. In either case, of course, the "guess" may be incorrect—this is often referred to as a "mispredicted branch." When this happens, the pipeline stalls and a few cycles are lost while the pipeline is refilled with the correct instructions.

It is often necessary to break the normal program flow in a microprocessor in order to perform some urgent, unscheduled function. For example, a microprocessor might be tasked with monitoring a boiler. Its normal activities might include reporting the temperature of the boiler and the volume of water it contains. It would be desirable, if the pressure within the boiler became dangerously high for instance, to have a means of preemptively overriding the normal activities of the processor to permit it to respond (as quickly as possible) to the situation—say, by venting the boiler and sounding an alarm. The speed with which a microprocessor executes in-line instructions is not a useful indication of how quickly it may react to such an unscheduled stimulus. Although the program may include instructions to periodically read the pressure gauge, if the processor is busy it may not get around to checking the pressure soon enough to avoid an explosion.

Interrupts provide a mechanism for forcing the processor to abruptly (and usually, temporarily) abandon its normal program to execute special instructions associated with the interrupt. Interrupts typically make use of special hardware features in the processor, such as an interrupt vector table. Each entry in the vector table is the address of a software routine associated with a particular interrupt (commonly known as an "Interrupt Service Routine" or "ISR"). For example, a processor may receive interrupts from external sources, such as a keyboard or mouse, as well as internal sources, such as a timer. For each potential interrupt source, there is an ISR designed to respond to the interrupt. Associated with every interrupt is an entry in the vector table, containing the address of the corresponding ISR. When an interrupt occurs, the processor finds the location in the vector table corresponding to the interrupt and performs an immediate jump to the address contained there. Additional special hardware in the processor makes it possible to resume processing following the interrupt.

Interrupts may arise from a variety of sources, such as timers, external alarms, user input, etc. A special class of interrupts, known as "exceptions," is generally associated with conditions originating within the processor itself. For example, a common type of exception occurs when the processor (generally because of an oversight on the part of the human programmer) attempts to divide by zero. When the processor attempts to perform this operation, an internally generated interrupt (i.e., an exception) redirects the processor to an interrupt vector—e.g. an error message generator.

To deal with the increased speed and complexity of today's integrated circuits, the semiconductor industry has developed a standard for on-chip testing. Issued as IEEE Std. 1149.1 and 1149.1a, the JTAG ("Joint Test Action Group") standard was developed to allow standardized testing of an integrated circuit after it has been assembled onto a printed circuit board. The JTAG standard defines an interface, by means of which diagnostic bit patterns ("test vectors") may be applied to the inputs and test results returned from the outputs of the core logic in the device under test. Test vectors are entered and test results retrieved in serial form. Consequently, providing a JTAG interface in an IC does not entail the addition of a large number of pins to the device package.

The diagnostic capabilities of a microprocessor may include the use of breakpoints on both data and instructions. Breakpoints permit the processor to run at full speed until a particular instruction or data value, or combination of instructions or data values is encountered, whereupon the processor is immediately halted. Breakpoints are a valuable debugging technique, since they allow the user to effectively "freeze" the processor at a precise stage in its execution and examine its internal state to reveal conditions leading to a problem. Breakpoints may be implemented by state machines in a hardware break module within the processor. These state machines constantly monitor the processor's internal address and data lines, comparing the values present on these lines to predetermined "target" values. The state machine for simple breakpoints responds at the first occurrence of a target address or data value, while the one for complex breakpoints responds to combinations of simple breakpoint events (and previous machine states). For example, a simple breakpoint could be defined to halt the processor as soon as the contents of a specified register become zero. A complex breakpoint, on the other hand, might halt the processor only if the register contains zero while the program counter is in a specified address range. EJTAG, is an extension of the JTAG standard, with a similar serial interface. To facilitate debugging, the simple and complex break state machines may be programmed via an EJTAG-compliant interface on the microprocessor.

A further diagnostic feature present in many advanced microprocessors is a real-time program counter (PC) trace. The PC trace feature outputs the current value of the program counter while the processor executes at full speed. If a problem occurs, the PC trace can furnish valuable data for a "post mortem" analysis. To reduce the overhead associated with the trace, program counter information is provided relative to a specified anchor point. Thus, when instructions flow sequentially, there is no need for continuous updating of the program counter value. Only when the program counter changes via a jump, branch, etc. is it necessary to indicate the new program location.

FIG. 2 contains a block diagram of an exemplary microprocessor, along with a hardware break module. Referring to FIG. 2, the Central Processor (CPU) 10 is directly coupled to a Memory Management Unit (MMU) 12, as well as to Complex Break Unit 14, within which is a Simple Break Unit 16. Execution of the CPU 10 can be temporarily halted by a Debug Break signal received from OR gate 30. Note that one of the sources of the Debug Break signal can be a Hardware Break signal from the Complex Break Unit 14. Similarly, OR gate 28 generates the Hardware Break signal in response to four possible inputs, three of which are generated by the Simple Break Unit 16, and one of which is generated by Complex Break Logic 24.

The Simple Break Unit 16 contains three modules (Instruction Address Match Logic 18, Processor Address Bus and Processor Data Bus Match Logic 20, and Data Address and Data Value Match Logic 22) that originate break inputs to OR gate 28. The three modules constantly compare values on the address bus, data bus and instruction bus with breakpoint values stored in internal registers (not shown), and generate trigger signals when there is a match. If Simple Breaks are enabled, these trigger signals are passed through OR gate 28 to OR gate 30, where they cause a break in the execution of the CPU 10. The three simple trigger signals are also forwarded to Complex Break Logic 24, which generates a trigger complex signal derived from combinations of simple break events. In the present embodiment, the Complex Break Logic 24 is implemented as a state machine, which changes state based on its current state and the trigger signals it receives from the Simple Break Unit 16. The three simple break triggers and the complex break trigger are also forwarded to OR gate 26, which generates a Trace Trigger signal 32, used to generate a PC trace.

As stated earlier, the use of fix-up cycles to handle load misses can lead to a problem for the diagnostic circuitry in a pipeline-equipped microprocessor. Recall that a fix-up cycle is inserted during the pipeline processing of an instruction requiring a data fetch. When data required by the instruction (typically, from cache memory) is not available in time to complete the MEM stage of the pipeline, a data load miss occurs. The pipeline must then be halted temporarily and a fix-up cycle added to the pipeline timing while the data is obtained.

Figure 3:
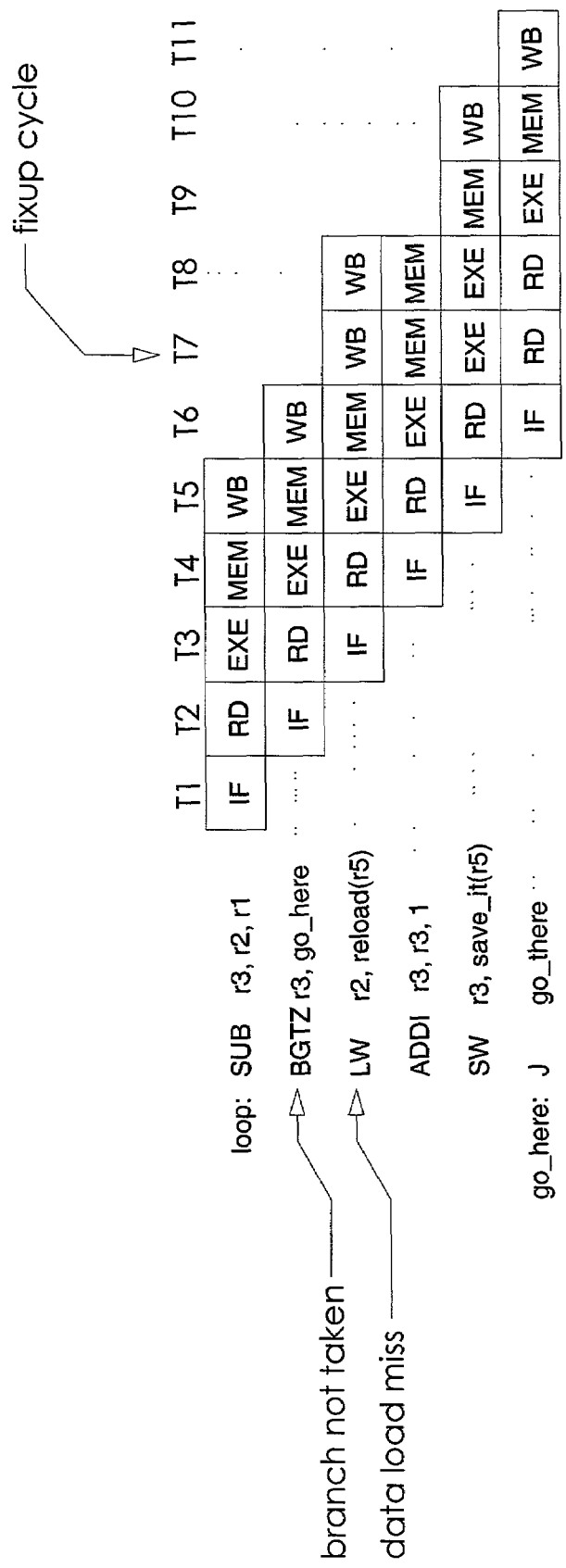
FIG. 3 illustrates the use of a fix-up cycle to handle a data load miss during an instruction occurring in a branch delay slot.

FIG. 3 illustrates the operation of the 5-stage pipeline for the following sequence of instructions:

| loop: | SUB | r3, r2, r1 |
|---|---|---|
| | BGTZ | r3, go_here |
| | LW | r2, reload(r5) |
| | ADDI | r3, r3, 1 |
| go_here: | SW | r3, save_it(r5) |
| | J | loop |

The first instruction in this example subtracts the contents of r1 from r2 and places the result in r3. The second instruction tests the subtraction result and branches conditionally (i.e., if the result is positive) to the instruction at the label "go_here." If the contents of r3 are not positive, the third instruction is executed, which loads a value from memory into r2. The fourth instruction simply increments r3, while the fifth instruction stores the value in r3 to memory. The sixth instruction starts the sequence all over again.

In FIG. 3, the instructions are shown to the left, in the order in which they are fetched from memory. To the right of each instruction is the sequence of operations performed on it in the pipeline, with the processor cycle associated with each operation shown above. As described earlier, during each processor cycle, the pipeline can perform the following five operations, for example, simultaneously:

| | |
|---|---|
| IF = | Instruction Fetch. |
| RD = | Instruction Decode and Read Operands From Register File. |
| EXE = | Instruction Execute - computational and logical instructions execute, conditional instructions are evaluated, and load/store address calculations are performed. |
| MEM = | Memory Access - CPU accesses cache for load/store instructions. |
| WB = | Write Back - CPU writes results back to register file. |

The pipeline states along any row indicate the stage of processing of a given instruction for each processor cycle. For example, the third row in FIG. 3 indicates that the LW instruction is fetched during processor cycle T3, decoded during processor cycle T4, executed during processor cycle T5, etc.

Since this instruction sequence includes a branch instruction, the behavior of the pipeline depends on whether or not the branch to "go_here" is taken. In this example, it is assumed that the branch will not be taken, so all of the instructions are executed in the order in which they appear in memory. Note that the third instruction (LW) occurs in a branch delay slot, and that a data load miss occurs during processor clock cycle T7, in the WB pipeline stage of this instruction. A fix-up cycle is inserted to allow the data required by the LW instruction to be fetched from memory. Processing of all of the pending instructions in the pipeline is temporarily suspended during the fix-up cycle. Thus, for example, the fourth instruction does not advance beyond the MEM pipeline stage from T7 to T8. On the other hand, the branch instruction has already left the pipeline by the time the fix-up cycle occurs—this event is recorded by the complex break logic within the state machine (item 24 in FIG. 2), as described in greater detail below.

Figure 4:
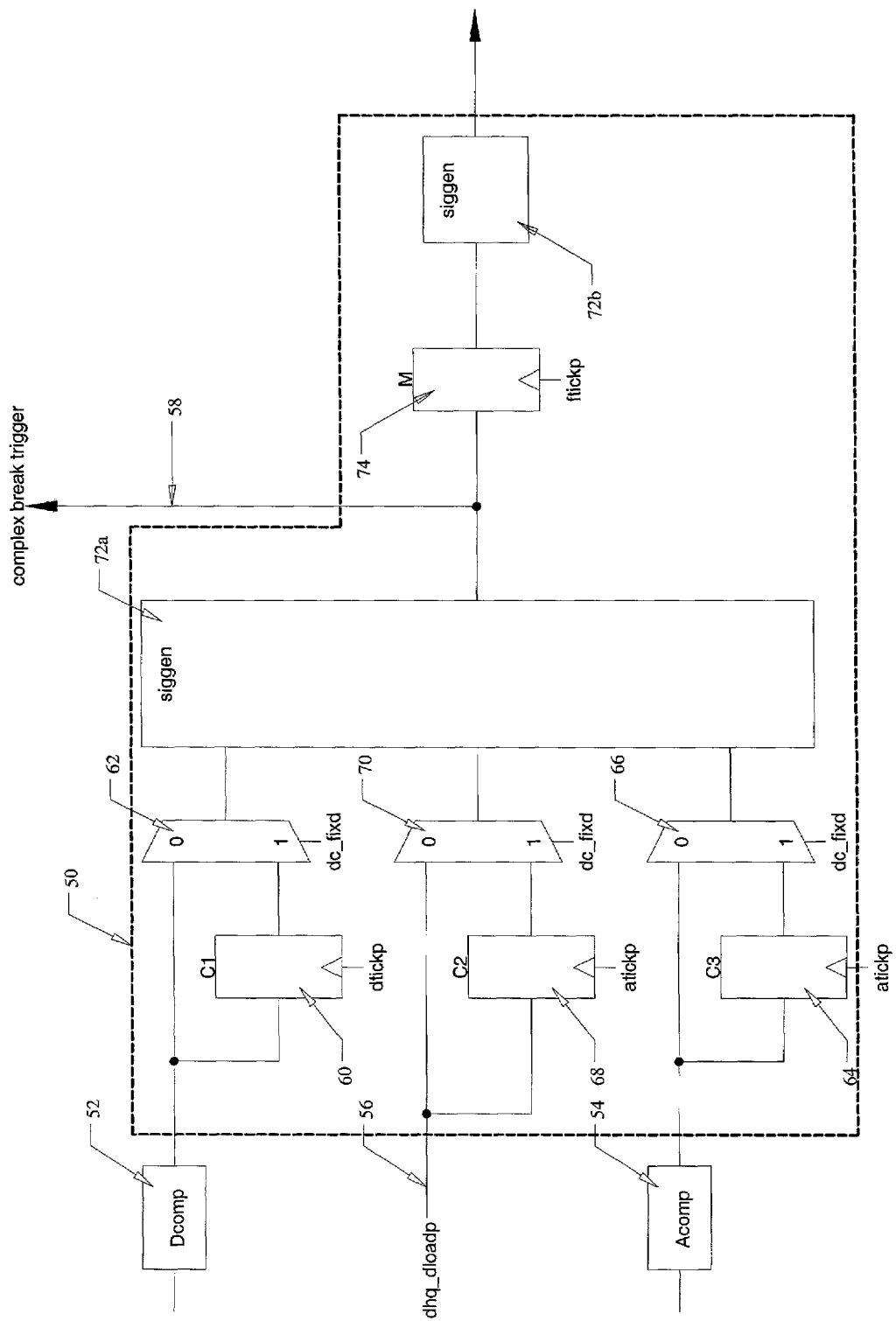
FIG. 4 is a block diagram of logic used by a prior art hardware break module for handling fix-up cycles.

A block diagram representing prior art logic for handling fix-up cycles in an exemplary pipelined processor is shown in FIG. 4. The fix-up logic 50 receives inputs from data 52 and address 54 breakpoint comparators; these comparators generate an active logic level signal when a data or address breakpoint is detected. The output of data and address comparators 52 and 54 is latched by registers C1 60, and C3 64, respectively. Similarly, signal dhq_dloadp, signifying a data load in the MEM stage of the pipeline, is latched by register C2 68. During a fix-up cycle, the inputs to the data and address comparators may change state, so registers C1–C3 preserve the state of their respective signals for use by the complex break state machine. Multiplexers 62, 66 and 70 select between the current and the saved state of the data, address and dhq_dloadp signals, respectively. If a fix-up cycle is in progress, the signal dc_fixd is active, and each multiplexer couples the output of its respective register to the siggen module 72a. The siggen module 72a generates trigger signals to halt the processor, initiate a PC trace, etc. During a fix-up cycle, the siggen module 72a also places the combined states received from multiplexers 62, 66 and 70 into register M 74, the output of which is coupled to additional logic 72b within the siggen module.

The prior art logic just described suffers from a significant drawback that affects the operation of the on-chip debug circuitry. This flaw relates to the manner in which the complex break state machine is updated when an exception occurs during the fix-up cycle for a conditional branch instruction. As previously described, the complex break state machine is updated each time a qualifying trigger event occurs. It is essential that these updates be accurate, since the breakpoints generated by the state machine are based on particular combinations of trigger events and previous machine states. However, under circumstances such as those described in connection with FIG. 3, the complex break state machine may receive an erroneous update.

Referring again to FIG. 3, recall that the branch instruction (BGTZ) emerges from the instruction pipeline during the fix-up cycle inserted to handle a data load miss associated with the instruction in the branch delay slot (LW). As stated above, this causes the diagnostic state machine to be updated. Now, assume that an exception occurs during the fix-up cycle T7. This can occur when the branch delay slot contains a special instruction that directly generates an exception, or with other types of instructions in that location that unintentionally result in an exception (e.g., an overflow on an arithmetic operation). In any case, the exception is summarily responded to by special program code within an exception handler.

When it has finished executing, the exception handler typically restores the program counter to the instruction following the one that caused the exception. However, when the instruction responsible for the exception occupies a branch delay slot, the exception handler returns the PC to the previous instruction—i.e., to the branch instruction (BGTZ) itself. However, this results in the instruction passing through the pipeline again, causing the diagnostic state machine to be (incorrectly) updated a second time. Thus, for the instruction sequence of FIG. 3, the prior art fix-up logic shown in FIG. 4 does not correctly update the complex break state machine. The two occurrences in the instruction pipeline of the same branch instruction will result in a spurious second update of the complex break state machine, violating specified requirements for the on-chip diagnostic module.

Figure 5:
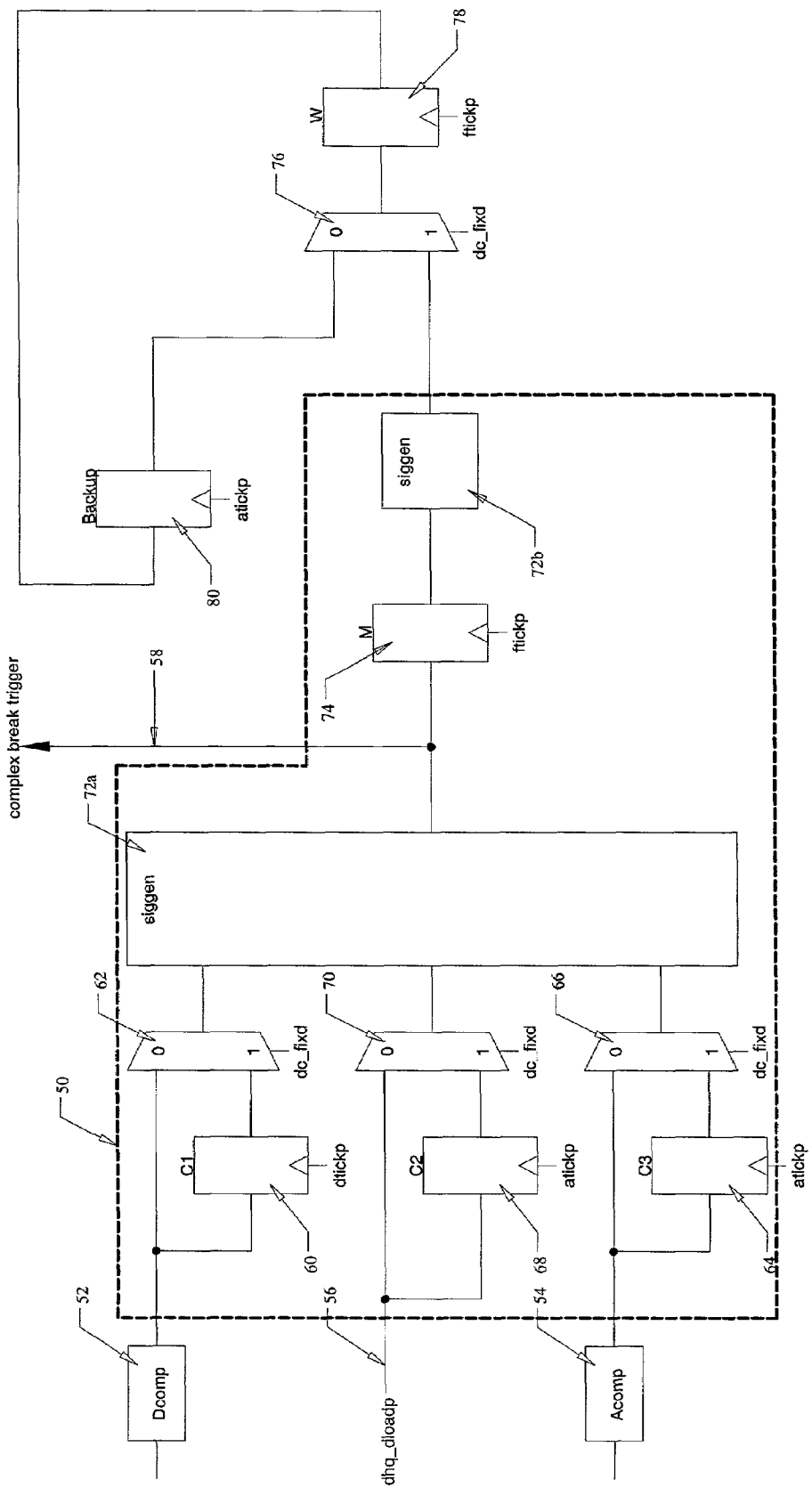
FIG. 5 shows an embodiment of the system and method disclosed herein, that prevents the hardware break module from incorrectly registering the re-executed branch instruction twice.

An embodiment of the system and method for backing up and restoring complex break state information, illustrated in FIG. 5, overcomes this problem. Note that some of the circuitry in FIG. 5 is contained in the prior art system shown in FIG. 4. Components in FIG. 5 that are also present in FIG. 4 have the same item numbers. In the embodiment shown in FIG. 5, the state contained in register M 74 is forwarded through a portion of the siggen circuitry 72b to multiplexer 76. During normal operation (i.e., not a fix-up cycle), the multiplexer selects this input and latches the state in register W 78. The contents of register W 78 are also copied into a Backup register 80. During a fix-up cycle, the multiplexer selects the contents of the Backup register 80, instead of the current state presented by the siggen module 72b.

In the embodiment of FIG. 5, the state saved in register W 78 will not be incorrectly updated a second time when the branch instruction is re-executed upon returning from the exception handler. Instead, the previous state (saved in the backup register 80) is retained. Thus, the state history of the complex break state machine, and the PC trace will correctly indicate only one execution instance of the branch instruction.

The system and method disclosed herein correctly update the complex break state machine in the diagnostic module of a microprocessor. Advantageously, this is accomplished without resorting to costly, extensive modification of the microprocessor architecture (e.g. lengthening the instruction pipeline). It is believed that this system and method may be incorporated into a high-performance microprocessor design with no loss in performance or capabilities.

It will be appreciated by those skilled in the art having the benefit of this disclosure that this invention is believed to present a system and method for saving and restoring the state of a diagnostic module. Further modifications and alternative embodiments of various aspects of the invention will be apparent to those skilled in the art in view of this description. Details described herein, such as the number of state machines in the diagnostic module and the exact manner in which machine states are backed up and restored, are exemplary of a particular embodiment. It is intended that the following claims be interpreted to embrace all such modifications and changes and, accordingly, the specification and drawings are to be regarded in an illustrative rather than a restrictive sense.

What is claimed is:

1. A method for saving and restoring states of a diagnostic module, comprising:
   providing a diagnostic module adapted to change its state in response to trigger events generated by a microprocessor and to halt the microprocessor in response to a specified combination of trigger events and previous states;
   saving the previous state of the diagnostic module in a backup register; and
   selecting between, a current state of the diagnostic module and the previous state stored within the backup register based on a trigger event, wherein;
      if the trigger event is not valid, the step of selecting comprises, using the backup register to restore the diagnostic module to its previous state.

2. The method as recited in claim 1, wherein generating a trigger event comprises issuing a specified memory address.

3. The method as recited in claim 2, wherein generating a trigger event further comprises accessing a specified data value.

4. The method as recited in claim 1, further comprising returning execution to a branch instruction upon returning from an exception associated with an instruction immediately following the branch instruction.

5. The method as recited in claim 4, further comprising generating an invalid trigger event by re-executing the branch instruction upon returning from the exception.

6. A microprocessor comprising a diagnostic module, said module comprising:
   a state machine adapted to change its internal state in response to trigger events generated by the microprocessor, and adapted to halt the microprocessor in response to a trigger event and a preceding internal state prior to the trigger event;
   a backup register adapted to save the preceding state of the state machine when it changes state in response to the trigger event; and
   state restoration logic comprising a multiplexer, which is coupled to the state machine for receiving a current state of the state machine, and coupled to the backup register for receiving the preceding state of the state machine, wherein the multiplexer is adapted to select the preceding state of the state machine for output by using the backup register to restore the state machine to its preceding state, when a control signal received by the multiplexer indicates that the trigger event is invalid.

7. The microprocessor as recited in claim 6, wherein the trigger events are generated in response to a specified memory address.

8. The microprocessor as recited in claim 6, wherein the trigger events are generated in response to a specified data value.

9. The microprocessor as recited in claim 6, wherein the microprocessor further comprises an exception handler that returns execution to a branch instruction, upon returning from an exception associated with an instruction immediately following the branch instruction.

10. The microprocessor as recited in claim 6, wherein an invalid trigger event comprises a branch instruction that is re-executed upon returning from the exception handler.

11. The microprocessor as recited in claim 6, wherein the microprocessor is equipped with an instruction pipeline.

12. The microprocessor as recited in claim 6, wherein the microprocessor is equipped with an enhanced joint test action group (EJTAG) compliant interface for supplying inputs to, and receiving outputs from, the diagnostic module.

13. The microprocessor as recited in claim 6, wherein the microprocessor is adapted to perform a trace function, which outputs the current location of the microprocessor program counter while the microprocessor executes program instructions, wherein the current location of the microprocessor program counter is specified relative to a trigger event generated by the microprocessor.

14. The microprocessor as recited in claim 6, wherein the multiplexer selects the current state of the state machine for output when a control signal received by the multiplexer indicates a valid trigger event.

15. The microprocessor as recited in claim 14, wherein the microprocessor generates a valid trigger event upon accessing a breakpoint defined by a specified memory address and/or a specified data value.

16. The microprocessor as recited in claim 6, wherein the microprocessor generates an invalid trigger event upon re-executing a branch instruction after returning from an exception associated with an instruction immediately following the branch instruction.

17. The microprocessor as recited in claim 6, further comprising an output register coupled between the multiplexer and the backup register, wherein the output register is adapted for storing the output selected from the multiplexer and for forwarding the output to the backup register for storage therein.

18. The method as recited in claim 1, wherein if the trigger event is valid, the step of selecting comprises using the current state of the diagnostic module as output.

* * * * *